May 7, 1968     S. H. SCHWARTZ     3,381,469
MULTI-RANGE THERMAL ELEMENT
Filed Aug. 15, 1966
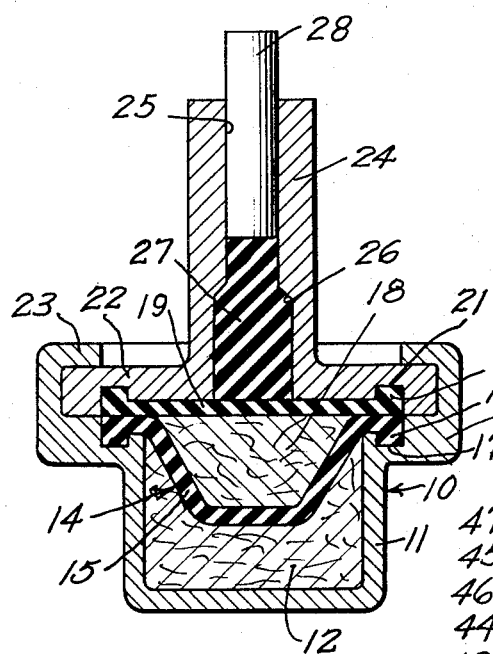
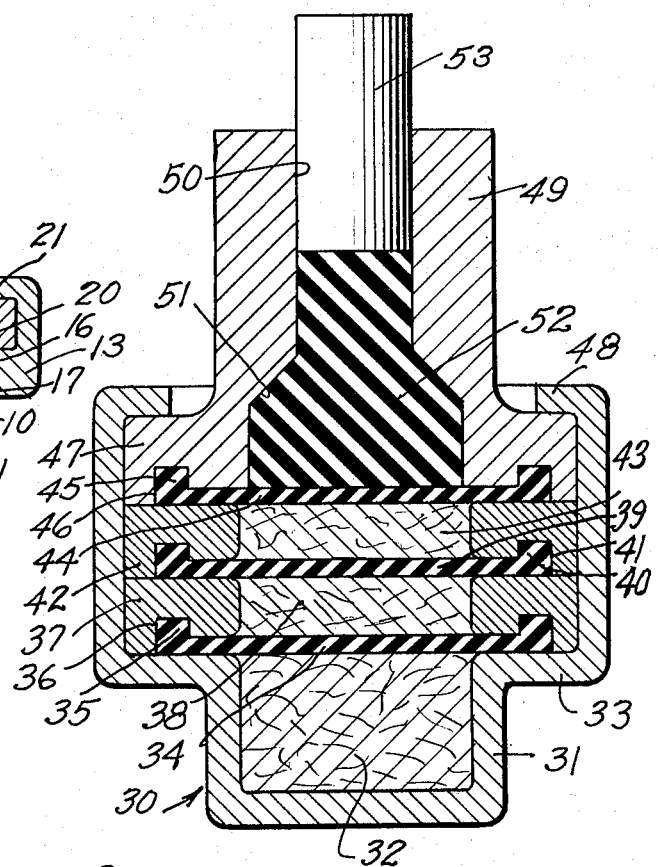
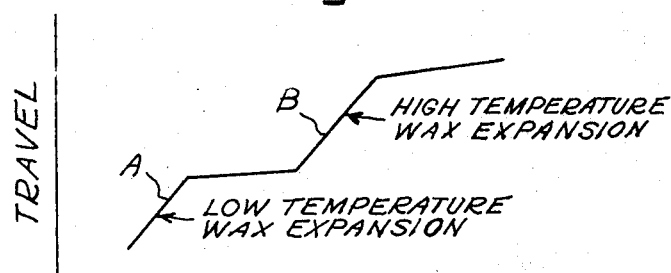
INVENTOR.
Samuel H. Schwartz
BY *Hill, Sherman, Meroni, Gross & Simpson*     ATTORNEYS

United States Patent Office 3,381,469
Patented May 7, 1968

3,381,469
MULTI-RANGE THERMAL ELEMENT
Samuel H. Schwartz, Deerfield, Ill., assignor to The Dole Valve Company, Morton Grove, Ill., a corporation of Illinois
Filed Aug. 15, 1966, Ser. No. 572,422
4 Claims. (Cl. 60—23)

ABSTRACT OF THE DISCLOSURE

A temperature responsive device comprising in a body a plurality of superimposed elastomeric elements alternating with different masses of temperature responsive media having different rates of expansion and which are in co-action in the body with a piston guide having a piston projecting therefrom and responsive to changes in said masses.

---

This invention relates to a temperature responsive force transmitting device, and more particularly to one wherein a multiple of temperature range responsive thermal elements are employed all acting on a common force applying piston.

While it has been found in the past that, in devices of the present character, some success may be obtained by mixing different temperature responsive materials in a common charge or pellet to provide different peaks of travel, the ensuing results are not always predictable. In fact, a travel curve plotted from the resultant action of such a mixture indicates that a curve of travel falls somewhere between the peaks of travel of the respective heat responsive materials.

Accordingly, it is an object of this invention to provide a multiple range thermally responsive force applying device wherein improved results are obtainable and without regard to the effect of any contact of the temperature responsive materials with each other.

Still another oject of this invention is to provide a temperature responsive force transmitting device with a multiple of different temperature responsive media out of contact with each other but all co-acting with a common force applying memer.

In accordance with the general features of this invention, there is provided in a temperature responsive transmitting device, a body provided with a cup at one side having a first thermally responsive material therein and a flange at the other side defining an opening, a first diaphragm over the material and retained on the flange, a second diaphragm retained over the first diaphragm and with a space between the diaphragm and having therein a second thermally responsive material, a piston guide secured in the opening, and a piston in the guide responsive to thermal activation of the materials for transmitting force, the material having different thermal rates of expansion.

Another feature relates to providing in the aforesaid device one thermally responsive material having a low temperature rate of expansion and at least one other with a higher rate of expansion. Other objects and features of this invention will more fully appear from the following detailed description taken in connection with the accompanying drawing which illustrates several embodiments thereof, and in which:

FIGURE 1 is a vertical cross-sectional view through one form of such device;

FIGURE 2 is a vertical cross-sectional view through a second form of the device; and FIGURE 3 is a diagrammatic chart in which the curves of travel of the different temperature responsive materials of the FIGURE 1 device are plotted.

As shown on the drawings:

The reference character 10 (FIGURE 1) designates generally a body or housing of the device made of any suitable material such, for example, as metal, and having a depending cupped portion 11 in which is disposed a mass 12 of thermally responsive material, such as wax or paraffin, having a given coefficient rate of expansion with an increase of temperature.

The body 10 has an annular outwardly extending flange 13 which supports a diaphragm 14 made of any suitable elastomeric or other rubber-like material having the characteristic of changing its shape under pressure from the material of charge 14 to transmit force.

In this form of the invention, the diaphragm 14 has a cupped central portion 15 and an annular shouldered flange 16 snugly received in a groove 17 in the body flange 13. Disposed in the cupped portion 15 is another charge of heat responsive material 18 having a different rate of expansion, with an increase in temperature, from that of the charge 12. For illustration, the charge 12 may have a low rate of heat expansion, whereas the charge 18 may have a higher rate of expansion with an increase of temperature.

Positioned over the top of the diaphgram 14 is another rubber-like diaphragm 19 having a shouldered peripheral portion 20 interlocked in a groove 21 of a metal closure and piston guide 22. This guide 22 is interlocked with the body 10 by an inwardly turned annular flange 23 spaced from body flange 13.

The piston guide and closure member 22 includes a stem-like portion 24 having a piston bore 25 which, at its lower end, communicates with an enlarged portion 26 of the bore in which is housed a cylindrical shouldered rubber plug 27. One end of the plug 27 bears against the diaphragm 19 and the other end is in contact with an end of a force applying piston 28 in the bore 25.

In the use of this device, an increase in temperature acting on the thermal charge 12 results in a movement or travel, such as diagrammatically plotted at A in the chart of FIGURE 3. Similarly, a higher temperature results in the cumulative effect of the movement occasioned by thermal charge 18 as designated at B on the chart of FIGURE 3.

It will be, therefore, apparent that, in the single thermally operated force applying element, a multiple of ranges of movement is made possible even though the thermal masses are separated from each other.

The form of the invention shown in FIGURE 2 illustrates a triple range of movement in a common device which suffices to demonstrate the use of the device with even more than two temperature responsive media in a common device.

The reference character 30 (FIGURE 2) designates generally a body or housing which may be made of any suitable material, such as metal. This body has a cupped portion 31 in which is disposed a temperature responsive mass 32 similar to the mass 12. The cupped body 30 has an annular flange 33 on which is supported an elastic or rubber diaphragm 34 including a shouldered peripheral margin 35 interlocked in a groove 36 of a metallic annular spacer 37 resting on the diaphragm. Positioned in the center of the ring-like spacer 37 is another mass or charge of thermally responsive material 38 which may be similar to the charge 18 in FIGURE 1. It is confined at its top by an elastic or rubber diaphragm 39 having an enlarged or shouldered peripheral portion 40 interlocked in a peripheral groove 41 on the underside of another metal ring or spacer 42.

Confined in the center of the ring 42 is still another thermally responsive mass 43 which may have an even higher rate of coefficient of expansion than that of mass 38.

Resting on the spacer 42 is a third elastic or rubber diaphragm 44 having an enlarged peripheral portion 45 interlocked in a groove 46 formed in a metal closure and piston guide 47.

The superimposed elements in the body 30 are all held in place by an inwardly turned annular flange 48 on body 30 spaced from flange 33.

The closure member and piston guide 47 has a stem-like portion 49 provided with a bore or piston guide 50 terminating at its lower end and an enlargement of the bore at 51. Snugly fitted in the bore enlargement 51 is an elastic or rubber plug 52 bearing at one end on the diaphragm 44 and at its upper end against an end of force applying piston 53 located in the bore 50.

The operation of this second form of the invention is essentially the same as that of the first form, with the exception that there is used a still third charge of heat responsive material which may have a still higher rate of temperature expansion than that of the other charges. It will be appreciated that all three charges 32, 38 and 43 may comprise any suitable material having coefficients of expansion with an increase in temperature. One such material, as is well known in the art, may be a suitable wax or paraffin.

The travel of the piston 53, in response to increases in temperature, can be plotted in a manner similar to that shown in FIGURE 3; there being merely added to FIGURE 3 another leg for the travel caused by the expansion of the third mass 43.

In both forms of the invention we thus have a multiple range temperature responsive device having different successive peaks of movement with progressive increases in temperature.

Although minor modifications might be suggested by those versed in the art, it should be understood that I wish to embody within the scope of the patent warranted thereon, all such embodiments as reasonably and properly come within the scope of my contribution to the art.

I claim as my invention:
1. In a temperature responsive transmitting device,
    a body provided with a cup at one side having a first thermally responsive mass of material therein and a flange at the other side defining an opening,
    a first diaphragm over said material and retained on said flange in said body,
    a second diaphragm entirely within said body and on said flange retained over said first diaphragm with a space between said diaphragms and having therein a second thermally responsive mass of material,
    a piston guide closing said opening and bearing on peripheral portions of said diaphragms over said flange in said body,
    a piston in said guide responsive to thermal activation of said materials for transmitting force therefrom, said materials having different thermal rates of expansion and means for holding the diaphragms and the piston guide in place in said body and on said flange.
2. The device of claim 1 further characterized by said first diaphragm being cupped into said body cup and having said second thermally responsive material in the cupped portion thereof.
3. The device of claim 1 further characterized by there being a third diaphragm provided with a space between it and the second diaphragm in which is disposed a third thermally responsive material and by all of said thermally responsive materials having different rates of expansion in response to temperature changes but all acting against said piston.
4. The device of claim 1 further characterized by there being a third diaphragm provided with a space between it and the second diaphragm in which is disposed a third thermally responsive material and by all of said thermally responsive materials having different rates of expansion in response to temperature changes but all acting against said piston, and said three materials having high, medium and low rates of expansion respectively.

References Cited

UNITED STATES PATENTS

| | | | |
|---|---|---|---|
| 386,557 | 7/1888 | Roberts | 60—23 XR |
| 2,736,604 | 2/1956 | Albright. | |

MARTIN P. SCHWADRON, *Primary Examiner.*

C. B. DORITY, *Assistant Examiner.*